United States Patent
Lin et al.

(10) Patent No.: US 9,811,080 B2
(45) Date of Patent: *Nov. 7, 2017

(54) MEASURING PERFORMANCE OF AN APPLIANCE

(71) Applicant: INTERNATIONAL BUSINESS MACHINES CORPORATION, Armonk, NY (US)

(72) Inventors: Ta-Wei Lin, Taipei (TW); Jeffrey C H Liu, Taipei (TW); Lin Chan Hsiao, Taipei (TW); Shu-Hao Liang, Taipei County (TW); Chih-Wen Su, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/781,736

(22) Filed: Feb. 28, 2013

(65) Prior Publication Data

US 2014/0081589 A1    Mar. 20, 2014

Related U.S. Application Data

(63) Continuation of application No. 13/731,093, filed on Dec. 30, 2012, now Pat. No. 9,541,921.

(30) Foreign Application Priority Data

Dec. 30, 2011   (TW) .............................. 100150086 A

(51) Int. Cl.
    *G05B 23/02*   (2006.01)
    *G06F 11/34*   (2006.01)

(52) U.S. Cl.
    CPC ...... *G05B 23/0202* (2013.01); *G06F 11/3409* (2013.01); *G06F 11/3466* (2013.01)

(58) Field of Classification Search
    CPC . H04L 12/2697; H04L 41/5009; H04L 43/50; H04L 67/02; G06F 11/3495;
    (Continued)

(56) References Cited

U.S. PATENT DOCUMENTS 4,597,082 A   6/1986   Hill
4,625,081 A   11/1986  Lotito
(Continued)

OTHER PUBLICATIONS

Aiello, Jeffrey, Notice of Allowance, U.S. Appl. No. 13/731,093, The United States Patent and Trademark Office, dated Sep. 12, 2016.

(Continued)

*Primary Examiner* — John Breene
*Assistant Examiner* — Jeffrey Aiello
(74) *Attorney, Agent, or Firm* — Yudell Isidore PLLC

(57) ABSTRACT

A method that measures performance of an information appliance comprises a test module receiving, from a client, and recording a request for processing of a sample data by an information appliance. The test module sends the sample data received from the client to the information appliance for processing. If a request to a backend application is present, the test module also sends the request to the backend application for processing and receives and records a response from the backend application. The test module sends the response from the backend application to the information appliance for processing. A generated correlation ID is used to update a performance data table with start time and a stop time of a response for transaction sample data processed by the information appliance.

17 Claims, 7 Drawing Sheets

US 9,811,080 B2
Page 2

(58) Field of Classification Search
CPC ........... G06F 2201/87; G06F 2201/875; G06F 11/34; G06F 11/3457; G06F 11/3612; G06F 11/3688; G06F 11/3664; G06F 2201/86; G06F 13/422
USPC .................................. 702/186; 709/203, 224
See application file for complete search history.

(56) References Cited

U.S. PATENT DOCUMENTS

| | | | |
|---|---|---|---|
| 4,866,429 A | 9/1989 | Granere | |
| 6,640,244 B1* | 10/2003 | Bowman-Amuah | G06F 9/466 707/999.01 |
| 6,701,363 B1 | 3/2004 | Chiu | |
| 7,552,445 B2 | 6/2009 | Green | |
| 7,685,083 B2 | 3/2010 | Fairweather | |
| 7,809,525 B2 | 10/2010 | Chagoly | |
| 8,380,820 B1 | 2/2013 | Kumarjiguda | |
| 8,819,171 B2* | 8/2014 | Chakraborty | G06F 3/14 709/203 |
| 9,541,921 B2* | 1/2017 | Lin | G06F 11/3409 |
| 2004/0019894 A1 | 1/2004 | Willard | |
| 2006/0026162 A1* | 2/2006 | Salmonsen | G06F 17/30035 |
| 2006/0167891 A1 | 7/2006 | Blaisdell | |
| 2006/0206246 A1 | 9/2006 | Walker | |
| 2008/0049775 A1* | 2/2008 | Morrill et al. | 370/419 |
| 2008/0126413 A1 | 5/2008 | Addleman | |
| 2008/0215664 A1 | 9/2008 | Dibbern | |
| 2008/0222107 A1 | 9/2008 | Maluf | |
| 2008/0288581 A1 | 11/2008 | Schneider | |
| 2009/0313438 A1 | 12/2009 | Krishnaprasad | |
| 2010/0034100 A1* | 2/2010 | Beyers | 370/250 |
| 2010/0046377 A1 | 2/2010 | Ryan | |
| 2010/0322089 A1 | 12/2010 | Raja | |
| 2010/0322237 A1* | 12/2010 | Raja | H04L 63/1433 370/389 |
| 2010/0325588 A1 | 12/2010 | Reddy | |
| 2011/0231730 A1 | 9/2011 | Allen | |
| 2013/0067018 A1 | 3/2013 | Reynolds | |
| 2013/0201316 A1 | 8/2013 | Binder | |

OTHER PUBLICATIONS

Aiello, Jeffrey, Non-Final Office Action, U.S. Appl. No. 13/731,093, The United States Patent and Trademark Office, dated Sep. 24, 2015.

Aiello, Jeffrey, Final Office Action, U.S. Appl. No. 13/731,093, The United States Patent and Trademark Office, dated May 17, 2016.

* cited by examiner

MEASURING PERFORMANCE OF AN APPLIANCE

US PRIORITY CLAIM

The present application is a continuation of U.S. patent application Ser. No. 13/731,093, titled "Method and Apparatus for Measuring Performance of an Appliance," filed on Dec. 30, 2012, the contents of which is incorporated herein by reference in its entirety.

FOREIGN PRIORITY CLAIM

This application is based on and claims the benefit of priority from Taiwan Patent Application 100150086, filed on Dec. 30, 2011.

BACKGROUND OF THE INVENTION

1. Technical Field

The present invention relates to information appliance performance measurement technology, and more particularly, to a method and apparatus for measuring the performance of an information appliance by means of a SoC (system-on-card) calculation unit.

2. Description of the Prior Art

Unlike general-purpose computer devices, an appliance is typically designed to serve a specific purpose or provide a specific service and thus is more robust. Compared with general-purpose computer devices, "appliances" are relatively "closed"—their specific operating systems and applications (or drivers) vary with their intended purposes and services.

An appliance, such as an access point, a digital TV set-top box, or a network file-sharing server, performs a specific transaction for serving a specific purpose. For sophisticated appliances, please refer to IBM® WebSphere® DataPower Series SOA Appliances or Tivoli® ISS Appliances® ("IBM," "WebSphere," and "Tivoli" are registered trademarks in the possession of International Business Machine in the United States and/or other countries).

In general, an information appliance can function as a reverse proxy capable of load balance, cache and data encryption, and adapted to send data from a user-end to a backend application on a network server at a back-end. One of the most frequently asked questions is about how to evaluate a transaction system achieving maximum throughput (transaction quantity per second.) However, the performance of an information appliance depends on the overall performance of the transaction system infrastructure and the payload of an input message. Thus, the performance of a series of systems equals that of the weakest one of the systems. If an infrastructure architecture does not match the performance of the information appliance, then the performance of the information appliance cannot be actually measured during a test. As a result, the performance of the information appliance cannot be assessed until the infrastructure architecture similar to a target environment is created. Thus, the construction process of the infrastructure architecture for use in performance testing is time-consuming and resource-consuming.

Hence, it is desirable to provide a solution that receives input samples for a client but dispenses with creating an infrastructure architecture of performance testing. Furthermore, the solution should be configured such that if an information appliance simulates dynamic states (such as packet loss and latency) of the infrastructure architecture, measurement results will approximate to a measured value in the clients' actual environment.

SUMMARY OF THE INVENTION

According to an embodiment of the present invention, there is provided a method for measuring the performance of an information appliance, the method comprising: a test module receiving and recording, from a client, a request for processing of a sample data by the information appliance. The test module sends the request for sample data to the information appliance for processing. The test module determines whether a request to a backend application for processing is present, and in response to determining a request to the backend application is present, the test module: sends the request to the backend application for processing; receives and records a response from the backend application; and sends the response from the backend application to the information appliance for processing.

In the aforesaid embodiment, the method further comprises: the test module generating a correlation ID and updating a performance data table according to the correlation ID; the test module retrieving the transaction sample data from the traffic data table (TDT) and sending the transaction sample data to the information appliance for processing; the test module receiving a response to the transaction sample data from the information appliance; in response to receiving the response to the transaction sample data from the information appliance, the test module updating the performance data table according to the correlation ID. The updates to the performance data table include at least a start time of the transaction sample data and a stop time of response of the transaction sample data processed by the information appliance.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The following description, the appended claims, and the embodiments of the present invention further illustrate the features and advantages of the present invention.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION OF THE EMBODIMENTS

Figure 1:
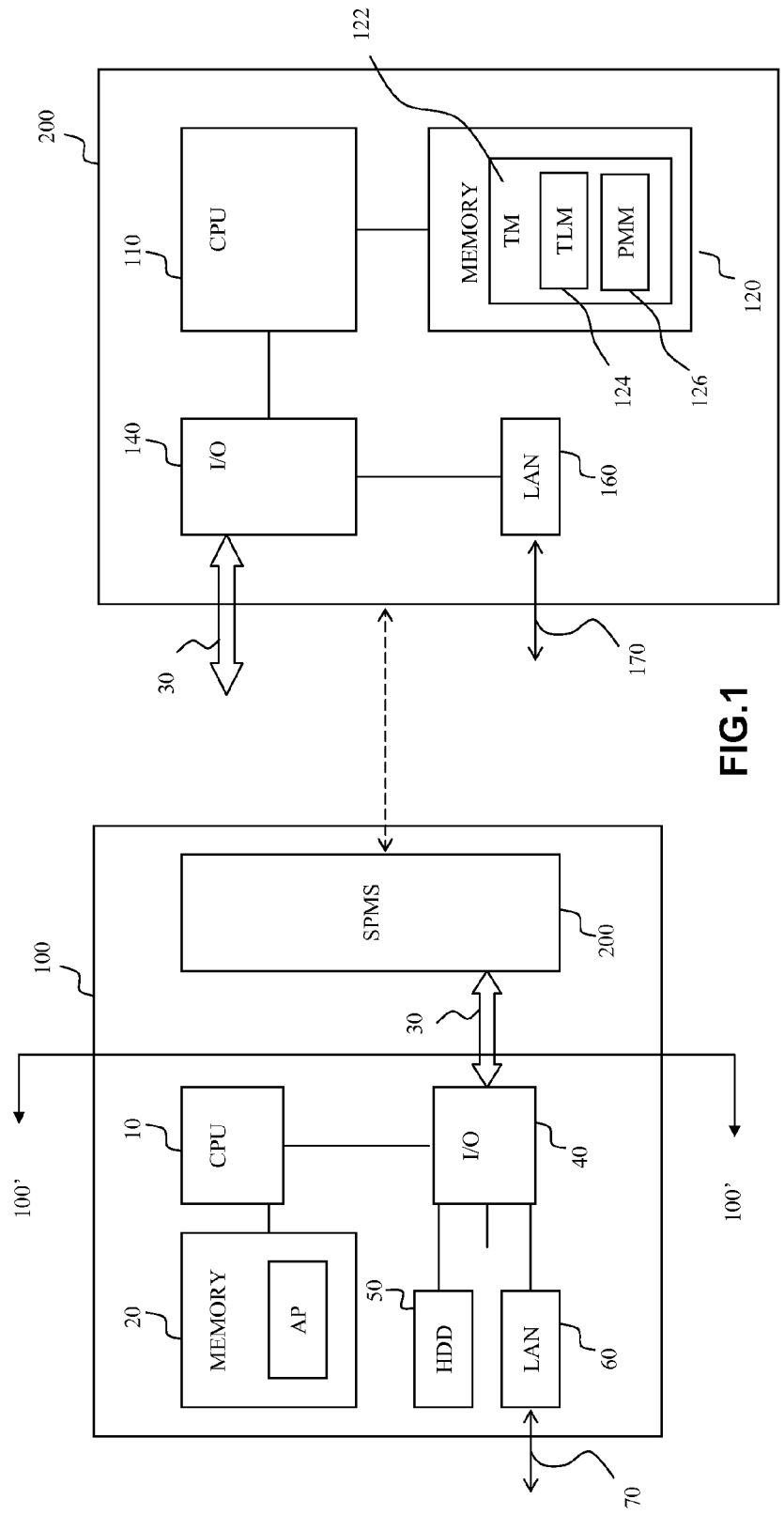
FIG. 1 is a block diagram of an information appliance and a system-on-card comprising a standalone performance measurement system (SPMS) according to an exemplary embodiment of the present invention.

Described herein are a method, information appliance, and computer program product for measuring the performance of an information appliance without creating an infrastructure architecture required for performance testing. Accordingly, the present invention may take the form of an entirely hardware embodiment, a processor-executable software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring now to FIG. 1 through FIG. 5B, appliances, methods, and computer program products are illustrated as structural or functional block diagrams or process flowcharts according to various embodiments of the present invention. The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring to FIG. 1, there is a schematic block diagram of an information appliance 100 and a system-on-card 200 comprising a standalone performance measurement system (SPMS) according to an exemplary embodiment of the present invention. In an embodiment, the information appliance 100 is of a hardware architecture of IBM® WebSphere® DataPower Series SOA Appliances, or Tivoli® ISS Appliances®.

In an exemplary embodiment, the appliance 100 includes: a processor for executing various applications; a storage device for storing various information and program code; a display device, a communication device, and an input/output device which function as interfaces for communicating with a user; and a peripheral component or other components serving a specific purpose. In another embodiment, the present invention is implemented in another way having less or more other devices or components. The network can also be implemented in any form of a connection, including a fixed connection, such as a local area network (LAN) or a wide area network (WAN), or via the Internet through a dial-up connection provided by an Internet service provider (ISP). The network connection is not restricted to cable connection and wireless connection; instead, it can also be implemented by wireless connection in the form of a GSM connection or a Wi-Fi connection for communicating with a client computer. The network further comprises other hardware and software components (not shown), such as an additional computer system, router, and firewall.

Referring to FIG. 1, the information appliance 100 comprises a processor 10, a memory 20, an input/output (I/O) unit 40, and the system-on-card 200. The system-on-card 200 is coupled to the input/output (I/O) unit 40 via an input/output (I/O) bus 30. The input/output (I/O) bus 30 is a high-speed serial bus, such as a PCI-e bus or any other bus structure. It is also feasible for the input/output (I/O) bus 30 to be directly connected in any other ways such as by interconnected components or an additional card. The input/output (I/O) unit 40 can also be coupled to a hard disk drive 50 or a local area network (LAN) adapter 60. With the LAN adapter 60, the information appliance 100 communicates with a user-end computer via a network cable 70 and a network (not shown). The memory 20 is any of: a random access memory (RAM), a read-only memory (ROM), or an erasable programmable read-only memory (EPROM or Flash memory). Memory 20 stores an operating system, a program code of a dedicated application AP, and various other information. An operating system is executed on the processor 10 to coordinate and provide various component controls in the information appliance 100. The processor 10 accesses the memory 20 so as to execute application AP.

Persons skilled in the art understand that the hardware of the information appliance 100 depicted in FIG. 1 varies from embodiment to embodiment. Also, other internal hardware or peripheral devices, such as a Flash ROM, an equivalent non-volatile memory, or a CD-ROM, can be added to or substituted for the hardware shown in FIG. 1.

Referring to FIG. 1, the system-on-card 200 comprises a dedicated processor 110, a memory 120, an input/output (I/O) unit 140, and an operating system (not shown). The system-on-card 200 further comprises a local area network (LAN) adapter 160. Using the LAN adapter 160, the system-on-card 200 communicates with an external device (such as a user-end computer) via a network cable 170. System-on-card 200 is connected to the input/output (I/O) bus 30 of the information appliance 100 as soon as an additional card for use with a network device of the information appliance 100 is inserted into an expansion slot (not shown) of the information appliance 100. The memory 120 contains a program code of a test module (TM) 122. The processor 110 accesses the memory 120 to execute the test module (TM) 122 for performing a performance testing of the information appliance 100. The test module (TM) 122 comprises a traffic loading module (TLM) 124 for not only collecting recording the traffic, but also for creating and storing a traffic data table (TDT) (e.g., TDT 350 of FIG. 3A-B). The test module (TM) 122 further comprises a performance measurement module (PMM) 126 for performing a performance testing and also creating and storing a performance data table (PDT) (e.g., PDT 560 of FIG. 5A-B). More details of the traffic loading module 124 and the performance measurement module 126 are described below. The test module 122 further comprises a sending module and a receiving module (not shown).

Figure 2:
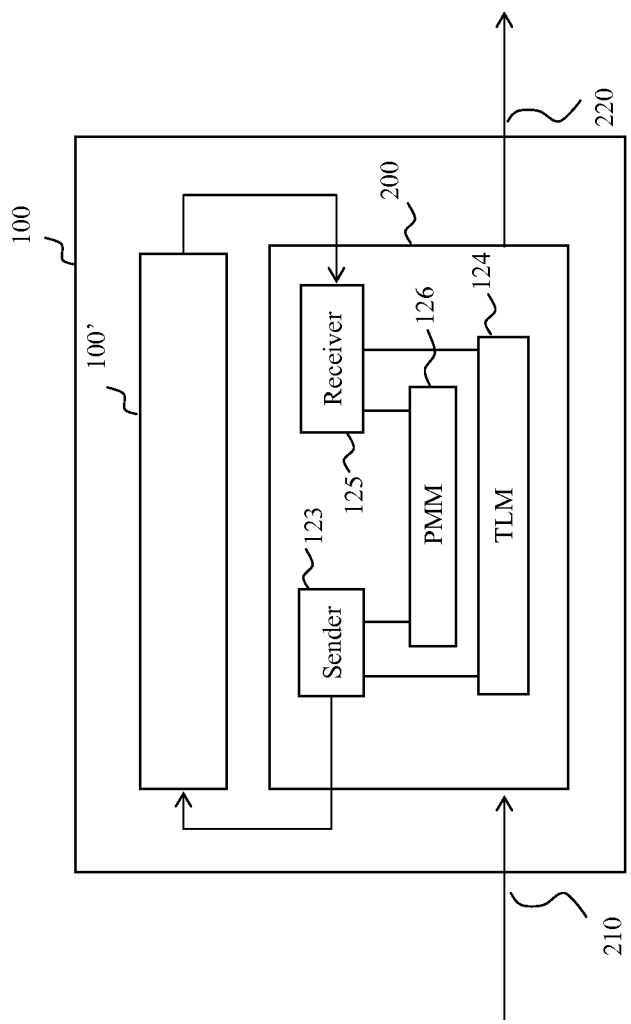
FIG. 2 is a block diagram of message delivery during the execution of a traffic loading module according to an embodiment of the present invention.

According to an embodiment of the present invention, a system-on-card 200 comprising the standalone performance measurement system (SPMS) first has to collect a sample data for use in a test. Referring to FIG. 2, there is shown a schematic view of message delivery during the execution of the traffic loading module 124 according to a specific embodiment of the present invention.

During a recording mode, the traffic loading module 124 directly receives and records a sample data sent from a client end, using a network input cable 210 of the LAN adapter 160 of the system-on-card 200, and then a sending module (or referred to as a sender) 123 of the test module 122 sends the sample data to a partial information to appliance 100' via the input/output (I/O) bus 30. The sample data is processed by the partial information appliance 100' and the processing result is sent via the input/output (I/O) bus 30 to a receiving module (or referred to as a receiver) 125 of the test module 122, thereby allowing the receiving module 125 to receive and record the result. If a request to a backend application (or referred to as a backend) is present, the request of the backend application is recorded and then sent to the backend application via a network output cable 220.

Likewise, the traffic loading module 124 also receives, via network input cable 210, and records a response of the processing result of the backend application, and then the processing result is sent from the sending module (or referred to as a sender) 123 to the partial information appliance 100' under test for processing. The processing result is sent back to the receiving module 125 of the test module 122 and receiving module 125 receives and records the result. The result is sent to the client end via network output cable 220.

The aforesaid sample data, the processing result of the partial information appliance 100', a request and processing result of the backend application are recorded and stored in a traffic data table (TDT) 350. According to an embodiment of the present invention, the traffic data table (TDT) 350 is stored in the memory 120 of the system-on-card 200 for instant use in measuring the performance of the partial information appliance 100', but the present invention is not limited thereto. In another embodiment, the traffic data table (TDT) 350 is stored in the memory 20 of the partial information appliance 100'. To begin a test, the system-on-card 200 directly accesses or loads the memory 120 of the system-on-card 200 via the high-speed input/output (I/O) bus 30. More details of the traffic loading module 124 and the traffic data table (TDT) 350, are provided within FIG. 3A and FIG. 3B and the description thereof.

Since the input/output (I/O) bus 30 of the present invention is a high-speed serial bus, such as a PCI-e bus, its bandwidth is much larger than the throughout (PCI-e bus supports 128 Gbps) of a typical network interface, the overall performance of the information appliance remains unaffected.

In another embodiment, the sample data thus collected and processed can be received by the partial information appliance 100' rather than directly fed into the system-on-card 200; meanwhile, the sample data thus received and its subsequent processing result can be directly recorded and stored in the memory 20 of the partial information appliance 100', the memory 120 of the system-on-card 200, or both, for use in a subsequent testing stage (that is, in a testing mode). To store them in the memory 120 of the system-on-card 200, it is necessary to amend the dedicated application AP initially present in the partial information appliance 100', such that it can store the aforesaid data in the memory 120 of the system-on-card 200.

Figure 3A:
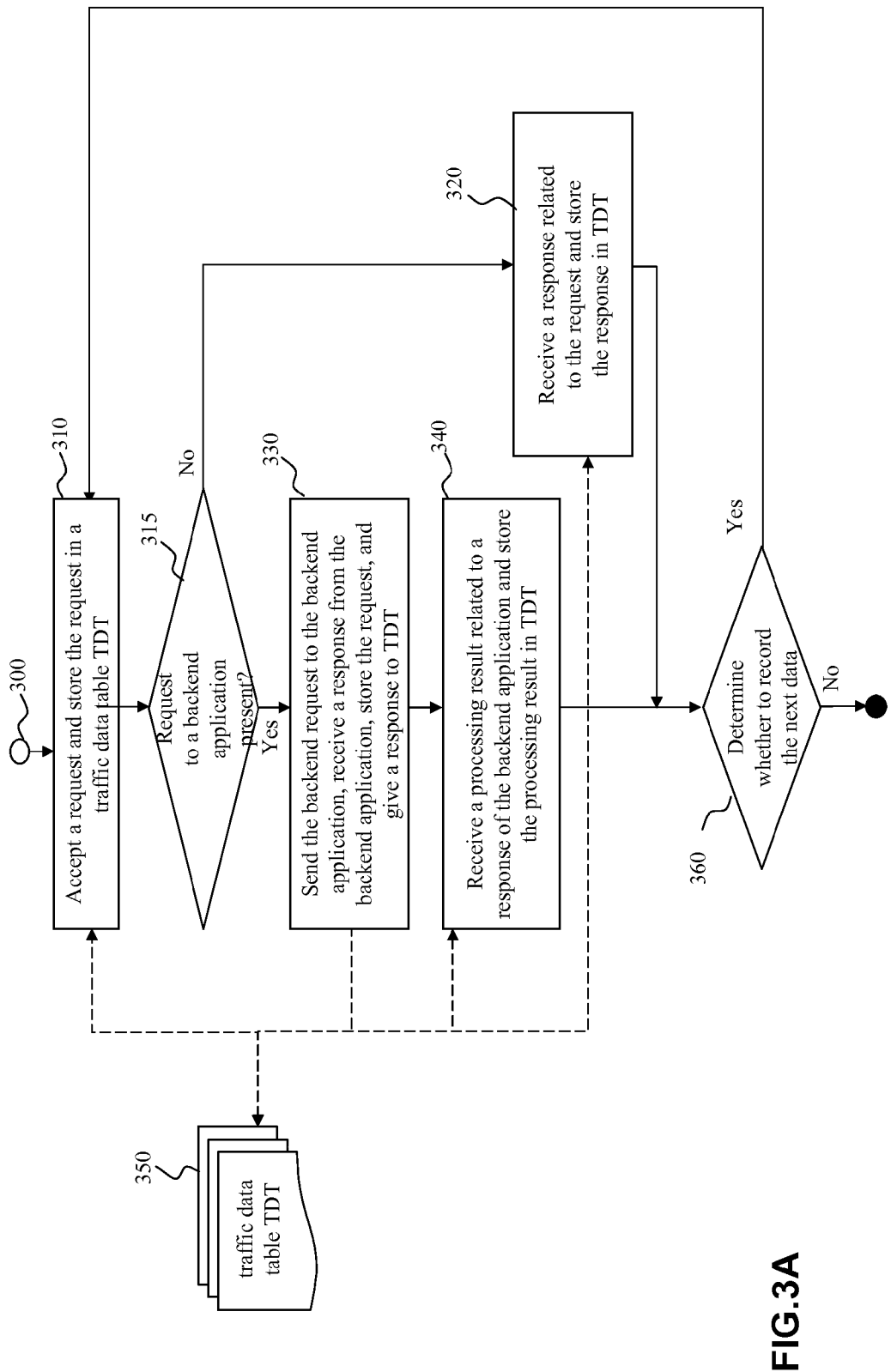
FIG. 3A is a flow chart of a method for use with a traffic loading module in a recording mode according to an embodiment of the present invention.
Figure 3B:
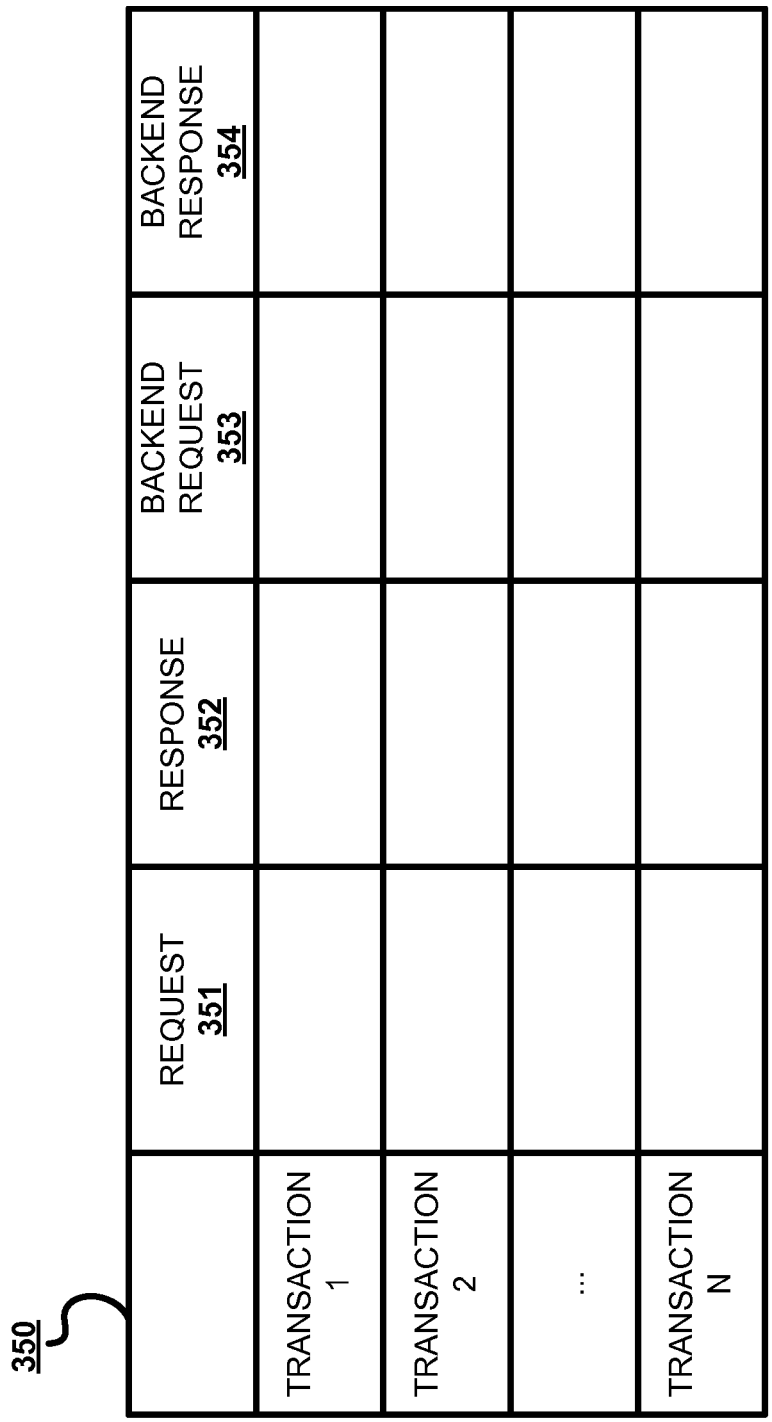
FIG. 3B is an exemplary traffic data table (TDT) created by and stored in the traffic loading module according to an embodiment of the present invention.

FIG. 3A is a flow chart of a method for use with the traffic loading module 124 in the recording mode according to an embodiment of the present invention. FIG. 3B is a traffic data table (TDT) 350 created by and stored in the traffic loading module 124. After initiator block 300, the process moves to step 310 where the traffic loading module 124 receives and records a request (such as REQUEST) related to a sample data and sent from a client end, and stores the request in a traffic data table (TDT) 350. As described above, the traffic data table (TDT) 350 is stored in the memory 120 of the system-on-card 200 or stored in the memory 20 of the partial information appliance 100'. Next, it is determined whether a request to a backend application is present (step 315).

If it is determined that no request to a backend application is present, the process flow of the method involves receiving a response, recording and storing in the traffic data table (TDT) 350 a result (such as RESPONSE) of the processing process performed by the partial information appliance 100' and related to the request (step 320).

If it is determined that a request to a backend application is present, the process flow of the method involves recording and storing a request (such as BACKEND REQUEST) to the backend application in the traffic data table (TDT) 350, sending a request of the backend application to the backend application, receiving a response from the backend application, and recording and storing a result (such as BACKEND RESPONSE) of the processing of the backend application in the traffic data table (TDT) 350 (Step 330).

At step 340 the result of the processing of the backend application is still sent by the sending module 123 to the partial information appliance 100' under test for processing. The processing result is still sent back to the receiving module 125 of the test module 122. The result (such as RESPONSE) is received and recorded by the receiving module 125 of the test module 122, and then stored in the traffic data table (TDT) 350. The result is sent to the client end via the network output cable 220.

At step 360 it is determined whether a request from the client end for the next sample data is present. The process continues to step 310 when the determination is affirmative. The recording mode is ended when the determination is negative and the process terminates.

All the aforesaid data (such as REQUEST, RESPONSE, BACKEND REQUEST and, BACKEND RESPONSE) are stored in a traffic data table (TDT) 350 and intended for use in the testing mode. In addition to their contents, the data comprises at least data size. In fact, the traffic data table (TDT) 350 may merely comprise REQUEST and BACKEND RESPONSE for use by a performance measurement module but does not need to record RESPONSE and BACKEND REQUEST.

According to an embodiment of the present invention, in the testing mode, the system-on-card 200 comprising the standalone performance measurement system (SPMS) tests the performance of the partial information appliance 100' by means of the transaction data put in the traffic data table (TDT) 350.

Figure 4:
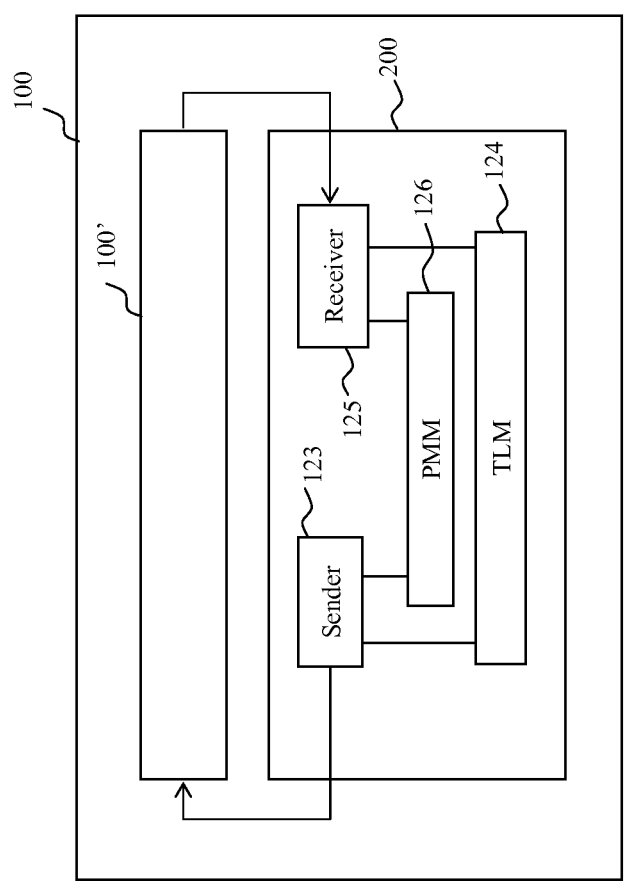
FIG. 4 is a schematic view of message delivery during the execution of a performance measurement module according to a specific embodiment of the present invention.

Referring to FIG. 4, there is shown a schematic view of message delivery during the execution of a performance measurement module 126 according to a specific embodiment of the present invention. During the testing mode, the performance measurement module 126 retrieves transaction sample data (such as REQUEST and BACKEND RESPONSE) (or "transaction data" for short) from the traffic data table (TDT) 350 and injects the retrieved transaction sample data into the partial information appliance 100'. The transaction data is sent from the sending module 123 of the test module 122 via the input/output (I/O) bus 30 to the partial information appliance 100' under test for processing. Upon completion of the processing process performed by the partial information appliance 100', the result is sent via the input/output (I/O) bus 30 back to the receiving module 125 of the test module 122, such that the result is received and recorded by the receiving module 125 of the test module 122. The performance measurement module 126 correlates the request (such as REQUEST and BACKEND RESPONSE) with a related response. Therefore, the performance (such as throughput) of the partial information appliance 100' under test can be calculated.

Figure 5A:
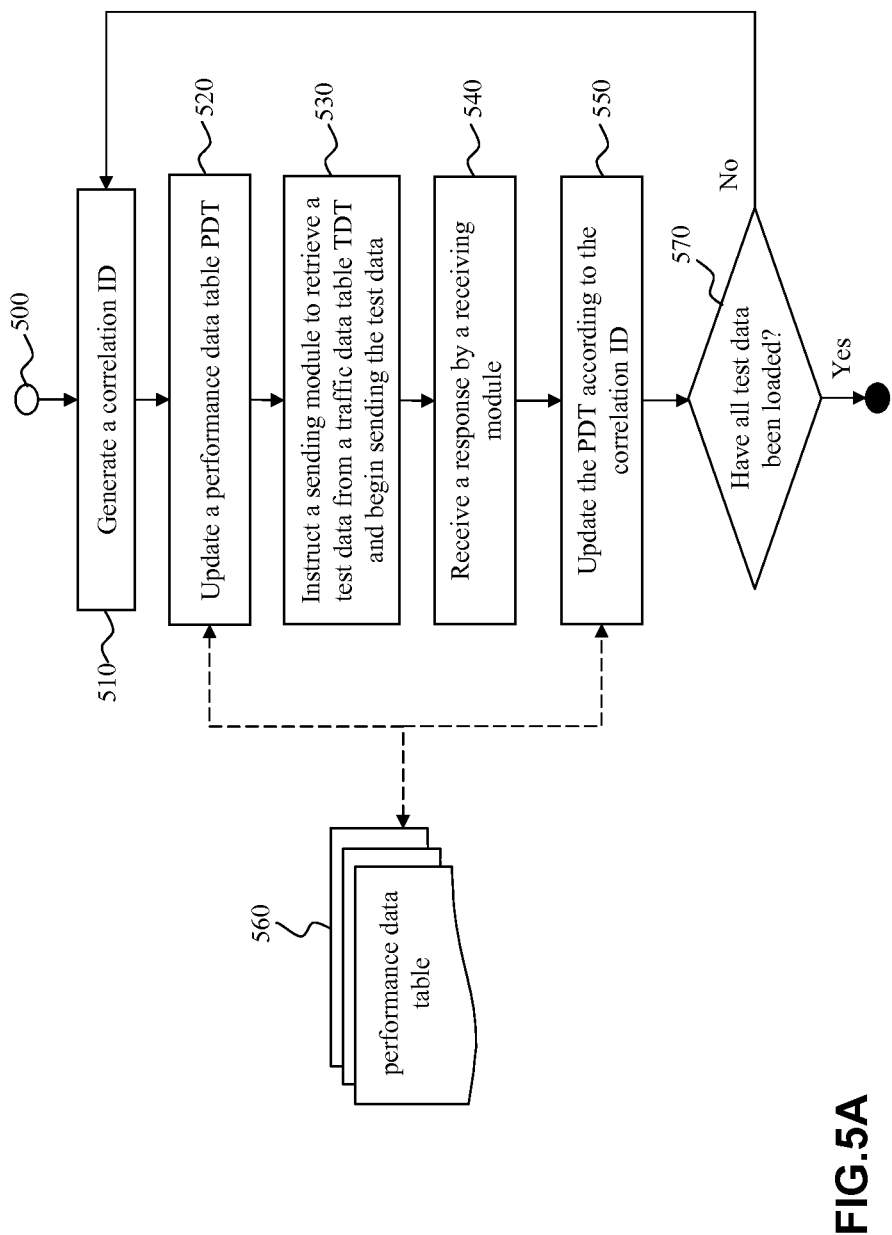
FIG. 5A is a flow chart of a method for use with a performance measurement module in a testing mode according to an embodiment of the present invention.
Figure 5B:
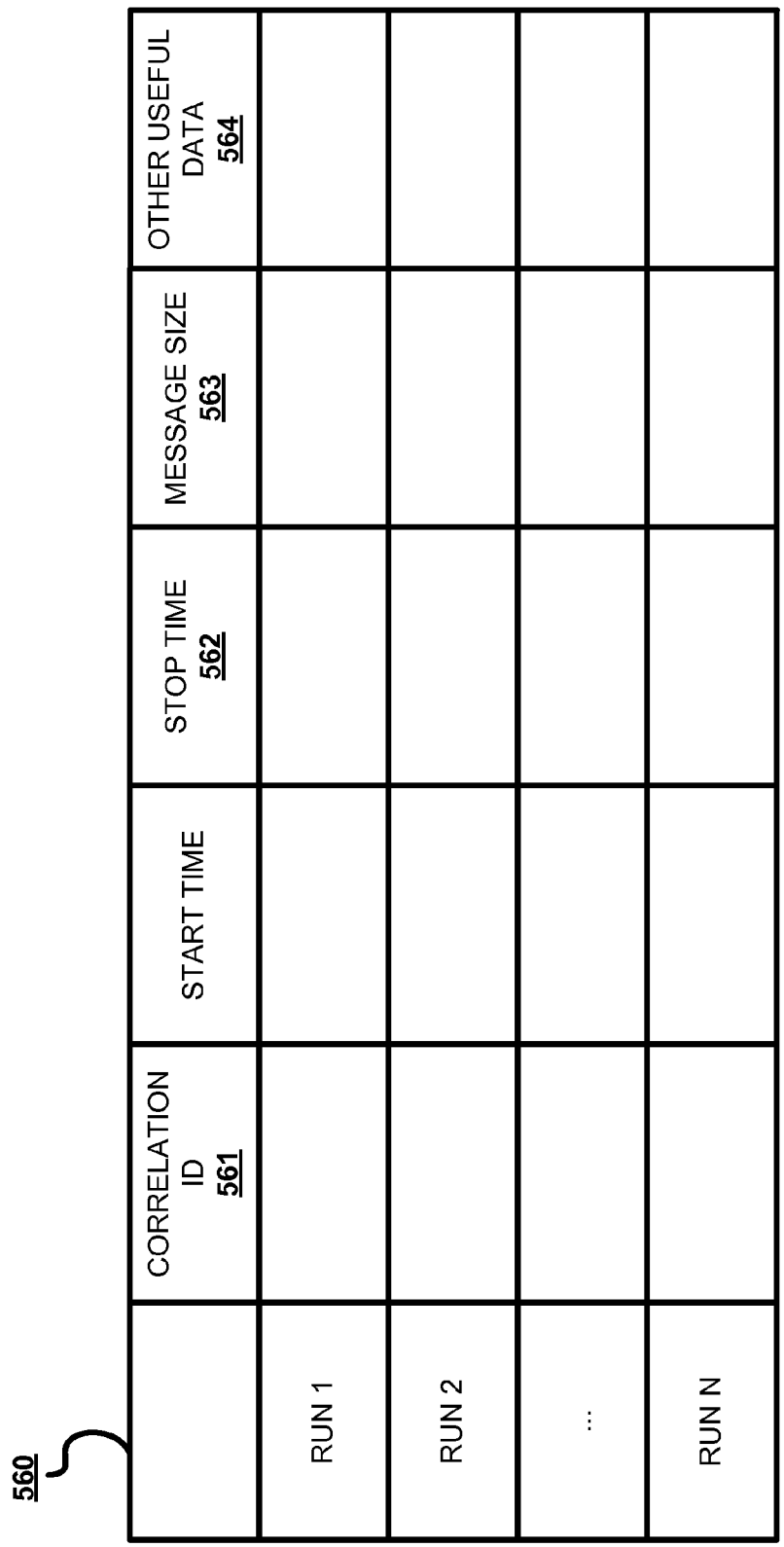
FIG. 5B is an exemplary performance data table (PDT) created by and stored in the performance measurement module according to an embodiment of the present invention.

FIG. 5A is a flow chart of the method for use with the performance measurement module 126 in the testing mode according to an embodiment of the present invention. FIG. 5B is the performance data table (PDT) 560 created by and stored in the performance measurement module 126. After initiator block 500, the process moves to step 510 where the performance measurement module 126 generates a correlation ID with regard to each injected transaction data. At step 520 the performance data table PDT 560 is updated according to the generated correlation ID and create a start time. At step 530 sending module 123 is instructed to retrieve a test data from the traffic data table (TDT) 350 and begin sending the test data to the partial information appliance 100' under test for processing the test data. The traffic receiving module 125 then receives a response, after the partial information appliance 100' under test has finished processing the test data (step 540). At step 550 related data, such as stop time, data size, and/or any other useful related metadata, is updated in the performance data table PDT 560 according to the correlation ID. For example, the other useful related metadata comprises sample data injection rate, packet loss rate, or latency. Finally, at step 570 it is determined whether all the test data have been loaded. The process continues to step 510 if the determination is negative. Otherwise, the testing mode ends if the determination is affirmative.

The performance, including the transaction quantity per second or quantity of data processed per second, of the partial information appliance 100' can be calculated by means of the start time, stop time and data size in the performance data table PDT 560. A conventional network controller of a typical network interface controls network parameters, such as the aforesaid injection rate, packet loss rate, or latency, and thereby simulates a network usage environment actually available to a client with a view of results which better meet client needs.

In addition to the aforesaid system-on-card of the standalone performance measurement system, the present invention can be implemented as a built-in unit of an information appliance. With regards to the input and output message contents, in addition to the aforesaid recorded transaction input and output of the normal transaction flow of the information appliance, an administrator can also upload the message contents to the standalone performance measurement system manually.

In conclusion, the present invention discloses operating a system-on-card and connecting the system-on-card to an input/output (I/O) bus of an information appliance by inserting an additional card for use with a network device of the information appliance into an expansion slot (not shown) of the information appliance, in order to simplify a process of measuring the performance of the network device and to replace a conventional resource-consuming process of creating a system infrastructure architecture for simulating client needs with a view to measure the performance of the network device more accurately and identify the optimal performance of the network device.

The foregoing preferred embodiments are provided to illustrate and disclose the technical features of the present invention and is not intended to be exhaustive or limited to the disclosure in the form disclosed. The corresponding structures, materials, acts, and equivalents of all means or step plus function elements in the claims below are intended to include any structure, material, or act for performing the function in combination with other claimed elements as specifically claimed. Many modifications and variations will be apparent to those of ordinary skill in the art without departing from the scope and spirit of the disclosure. In addition, many modifications may be made to adapt a particular system, device or component thereof to the teachings of the disclosure without departing from the essential scope thereof. The embodiment was chosen and described in order to best explain the principles of the disclosure and the practical application, and to enable others of ordinary skill in the art to understand the disclosure for various embodiments with various modifications as are suited to the particular use contemplated. Therefore, it is intended that the disclosure not be limited to the particular embodiments disclosed for carrying out this disclosure, but that the disclosure will include all embodiments falling within the scope of the appended claims.

Although the present disclosure and advantages thereof have been described in detail, it will be understood that various changes, substitution and transformation may be made thereto without departing from the spirit and scope of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

What is claimed is:

1. A method for measuring performance of an information appliance for a target environment of an external client device, the method comprising:
   a test module of a standalone performance measurement system (SPMS) receiving, at a local area network adapter of the SPMS from an external client device associated with a client, a request including transaction sample data to be processed by the information appliance, wherein the SPMS is coupled to the external client device via the local area network adapter wherein the information appliance comprises a processor, a first memory, and a first input/output (I/O) unit, and wherein the SPMS is a system-on-card that comprises a dedicated processor, a second memory, and a second I/O unit that is coupled to a high-speed I/O serial bus of the information appliance;
   in response to receiving the transaction sample data, the test module recording the transaction sample data in a traffic data table (TDT) of the test module;
   the test module injecting the transaction sample data to the information appliance via the high-speed I/O serial bus to initiate a test of a performance of the information appliance;
   during the testing of the information appliance, the test module locally simulating a physical infrastructure architecture and a network usage environment of the target environment of the external client device, wherein the simulated infrastructure architecture replaces the physical infrastructure architecture during the testing of the information appliance;
   in response to testing the performance of the internet appliance, the test module receiving, via the high-speed I/O serial bus, response data associated with the processing of the transaction sample data by the information appliance;
   the test module calculating, for the target environment and based on the response data, results of the performance test of a network device of the information appliance, wherein the results include a transaction quantity per second and a quantity of data processed per second; and
   transmitting, to the external client device via the local area network adapter, the response data and a view of the results of the performance test which meet performance needs of the client.

2. The method of claim 1, wherein:
   testing the performance of the internet appliance further comprises: the test module generating a correlation ID and updating an entry of a performance data table (PDT) with the correlation ID; and
   the method further comprises:
      in response to receiving the response data:
         the test module updating the entry of the PDT corresponding to the correlation ID, wherein the updates to the PDT include at least a start time of the transaction sample data and a stop time associated with the processing of the response data; and the test module recording metadata related to the response data within the PDT according to the correlation ID, the metadata comprising one or more of a stop time and data size of the transaction sample data.

3. The method of claim 2, wherein the PDT includes transaction sample data size.

4. The method of claim 1, wherein the SPMS further comprises a local area network (LAN) adapter that is utilized to communicate with an external device via a network cable.

5. The method of claim 2, wherein:
the SPMS comprises program code that is executed by the processor to perform a performance testing of the information appliance, the program code providing:
a traffic loading module (TLM) for collecting and recording the traffic and for creating and storing the TDT;
a performance measurement module (PMM) for performing a performance test and that creates and stores the PDT;
a sending module; and
a receiving module.

6. The method of claim 5, further comprising:
the PMM retrieving transaction sample data from the TDT; and
the PMM injecting the retrieved transaction sample data into the information appliance.

7. The method of claim 6, wherein:
the transaction sample data is sent from the sending module of the test module via the high-speed I/O serial bus to the information appliance for processing; and
the method further comprises:
receiving a response related to the request; and
correlating the request with the related response.

8. The method of claim 2, further comprising:
recording a start time within the PDT associated with the correlation ID;
instructing the sending module to retrieve a test data from the TDT and to begin sending the test data to the information appliance; and
receiving, via the traffic receiving module, a response from the information appliance, after the information appliance has finished processing the test data;
wherein the metadata further comprises at least one of an injection rate, packet loss rate, or latency associated with the response data.

9. The method of claim 2, further comprising,
the test module sending the transaction sample data and the request for processing of the sample data to the information appliance for processing;
the test module determining whether a request to a backend application for processing is present; and
in response to determining a request to the backend application is present, the test module:
sending the request to the backend application for processing;
receiving and recording a response from the backend application to the TDT, wherein the transaction sample data includes the response from the backend application; and
sending the response from the backend application to the information appliance for processing.

10. The method of claim 4, wherein the system-on-card is connected to the information appliance by inserting the system-on-card into an expansion slot of the information appliance, and wherein inserting the system-on-card into an expansion slot of the information appliance interconnects the second I/O unit to the first I/O unit via the high-speed I/O serial bus.

11. The method of claim 1, wherein the SPMS is a built-in unit of the information appliance.

12. The method of claim 1, wherein the network usage environment is simulated based on network parameters established by a network controller of a network device of the information appliance, the network parameters comprising: an injection rate of the transaction sample data, a packet loss rate of transaction sample data, and latency of the transaction sample data.

13. The method of claim 1, wherein the transaction quantity per second and a quantity of data processed per second are calculated based on a start time of the transaction sample data, a stop time associated with the processing of the response data, and a data size of the transaction sample data.

14. The method of claim 1, wherein the infrastructure architecture comprises a network having at least one network server.

15. The method of claim 1, wherein the high-speed I/O serial bus is a Peripheral Component Interconnect Express (PCIe) bus.

16. The method of claim 1, further comprising:
determining whether a next request has been received from the external client device, wherein the next request includes a next transaction sample data to be processed by the information appliance; and
in response to determining the next request has been received, reinitiating the performance test of the information appliance using the next transaction sample data.

17. The method of claim 1, wherein the high-speed I/O serial bus provides a greater communications bandwidth than the local area network adapter.

* * * * *